United States Patent [19]

Russ

[11] Patent Number: 4,557,124

[45] Date of Patent: Dec. 10, 1985

[54] POWER KEY TURNER

[76] Inventor: Norman Russ, Box 508, Norwich, Conn. 06360

[21] Appl. No.: 493,235

[22] Filed: May 10, 1983

[51] Int. Cl.[4] ............................................. A47G 29/10
[52] U.S. Cl. .................................................. 70/456 R
[58] Field of Search ................. 70/1, 408, 456 R, 459; 81/3 R; 173/163; 362/116; 206/38, 38.1; 403/328

[56] References Cited

U.S. PATENT DOCUMENTS

| | | | |
|---|---|---|---|
| 2,002,818 | 5/1935 | Jones | 70/456 R |
| 2,693,101 | 11/1954 | Lewis | 70/456 R |
| 3,707,303 | 12/1972 | Petri | 403/328 |
| 3,788,168 | 1/1974 | Steinmann, Jr. | 81/3 R |
| 3,797,291 | 3/1974 | Simorghi | 70/456 R X |
| 3,802,518 | 4/1974 | Albert | 173/163 X |
| 3,935,909 | 2/1976 | Mabuchi et al. | 173/163 |
| 4,366,871 | 1/1983 | Dieterle et al. | 173/163 |

Primary Examiner—Robert L. Wolfe
Attorney, Agent, or Firm—McCormick, Paulding & Huber

[57] ABSTRACT

This invention consists of a small motor powered by dry cell batteries, which may be varied in number to provide the torque or turning power required to open a lock. A drive plate of friction material is attached to the motor shaft, and when the turner with a key in place is inserted into a lock, the drive plate will contact a similar plate that is fastened to the key-retention head. Such contact will cause the head to rotate and produce the required force needed to open the lock. Should a stubborn lock be encountered, the drive plates will slip and prevent a possible broken key. This arrangement also allows "jogging" of the key rotation which may be helpful in loosening a resistant lock. Another feature of this device is the capability of varying the power needed simply by changing the number of batteries and the body segments that enclose them.

2 Claims, 3 Drawing Figures

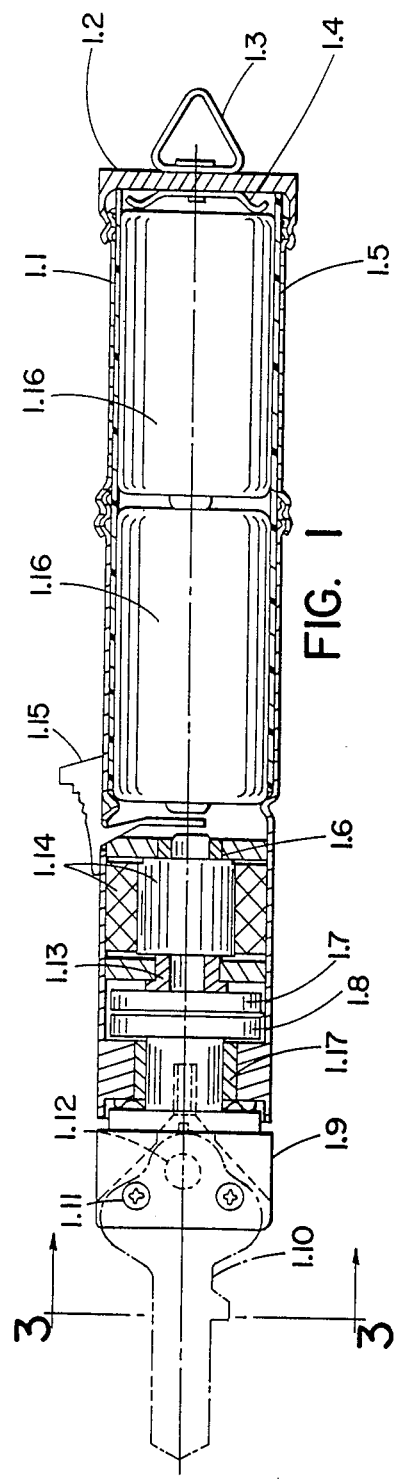
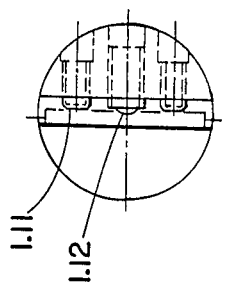
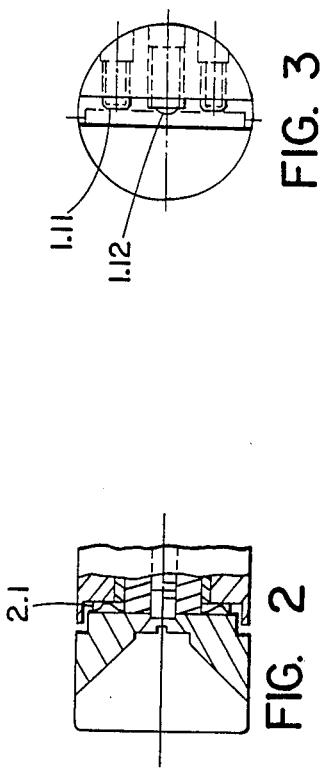

POWER KEY TURNER

This invention relates to power operated devices for turning keys in a lock, and deals more particularly with a dry cell battery operated unit approximately the size of a small flashlight, and intended mainly for industrial and institutional use where large or heavy door locks are installed.

The chief aim of the present invention is to provide a power key turner which will prevent key breakage do to stubborn locks.

DETAILED DESCRIPTION OF THE DRAWINGS

FIG. 1 is a sectional view through a power key turner incorporating the present invention and illustrates the mechanical and electrical components in assembled relationship.

FIG. 2 is a partial section to the head showing the key slot or recess to accommodate the head of a typical key.

FIG. 3 is a sectional view taken generally on the line 3—3 of FIG. 1.

DETAILED DESCRIPTION

As best shown in FIG. 1 a body portion 1.1 with rolled threads permits various assembled lengths of power key turner dependent only upon the number of batteries 1.16 to be used. An end cap 1.2 retains a hook 1.3 and a contact spring 1.4 is provided inside this end cap.

A non-metallic liner 1.5 is employed inside the body portion to absorb any battery leakage. The rear rotor bearing 1.6 is supported in a wall or bulkhead and another bulkhead supports a front bearing 1.13 between which bulkheads is provided a rotor or armature 1.14 of the motor. Drive plate 1.7 and clutch plate 1.8 achieve rotation of head 1.9. Flat head set screws are provided to secure the key 1.10 in the slotted recess of the head. A spring loaded ball detent 1.12 prevents the key from dropping out while to the two set screws 1.11 are tightened to hold the key in place.

Slide switch 1.15 is located near the front of the device and is adapted for either on/off or jogging control.

A trigger 1.15 is adapted to be pulled rearwardly, that is away from the forward or key attached end of the device so that a depending contact will engage the positive output end of the dry cell 1.16. This will energize the windings of the small electric motor 1.14 and thereby achieve rotation of the armature or rotor so that clutch plate 1.7 will rotate and thereby cause the frictionally coupled plate 1.8 adjacent thereto also to rotate. These clutch plates 1.7 and 1.8 are adapted to permit continued rotation or the armature or rotor when a predetermined torque on the key 1.10 has been achieved.

We claim:

1. A power key turner comprising DC motor means, a source of DC power, clutch means including a drive plate and a driven plate, said drive plate coupled to said motor, chuck means coupled to said driven plate, said chuck means comprising a generally cylindrically shaped body rotatably supported for rotation on an axis coincident with the axis of said motor means and clutch means, said chuck means defining a forwardly open generally radially extending key slot having parallel side walls adapted to receive the head of a key therebetween, and having inclined end walls adapted to engage the edges of the key head, said chuck means further including laterally spaced threaded openings, each opening receiving a set screw engageable with the head of the key to retain the key in place.

2. The key turner defined in claim 1 above wherein said chuck means further includes a spring biased ball detent normally urged toward one side of said key slot, said spring biased ball being adapted to engage the key ring opening normally provided in the head portion of a typical key.

* * * * *